United States Patent [19]

Nishikawa

[11] Patent Number: 5,529,183

[45] Date of Patent: Jun. 25, 1996

[54] FLOPPY DISKETTE HOLDER

[75] Inventor: Masao Nishikawa, Osaka, Japan

[73] Assignee: Sekisei Co., Ltd., Osaka, Japan

[21] Appl. No.: 236,038

[22] Filed: May 2, 1994

[30] Foreign Application Priority Data

May 6, 1993 [JP] Japan .................... 5-105710

[51] Int. Cl.⁶ .................................................. B65D 1/36
[52] U.S. Cl. ........................... 206/308.3; 206/456
[58] Field of Search .................. 206/309, 444, 206/456, 387, 308.3, 455

[56] References Cited

U.S. PATENT DOCUMENTS

| | | | |
|---|---|---|---|
| D. 307,076 | 4/1990 | Ozeki | 206/444 X |
| D. 307,513 | 5/1990 | Ozeki | 206/444 X |
| D. 307,667 | 5/1990 | Ozeki | 206/444 X |
| 4,236,635 | 12/1980 | Namiki | 206/456 |
| 4,676,374 | 6/1987 | Wilkins | 206/455 X |
| 4,691,826 | 9/1987 | Ozeki | 206/456 |
| 4,724,956 | 2/1988 | Ozeki | 206/456 X |
| 4,860,897 | 8/1989 | Fowler et al. | 206/308.3 X |
| 4,928,828 | 5/1990 | Cohen | 206/444 |
| 5,011,016 | 4/1991 | Ozeki . | |
| 5,226,537 | 7/1993 | Ozeki . | |

*Primary Examiner*—Bryon P. Gehman
*Attorney, Agent, or Firm*—Law Office of Steven M. Rabin

[57] ABSTRACT

A floppy diskette holder for storage of three and one-half inch hard case floppy diskettes is disclosed. The floppy diskettes are held in FD receptacles in an array on each side of a rectangular frame molded of elastic resin. A pair of resilient tabs extend from both ends of an open edge of one side wall of each FD receptacle so as to press both outside portions of the slide cover of the floppy diskette. A pair of hook holders project at both ends of an upper side of the rectangular frame for holding hooks. The hooks are used to engage with hanger rails in desk's file drawer. An index tab is provided between the hook holders for convenient reference.

15 Claims, 4 Drawing Sheets

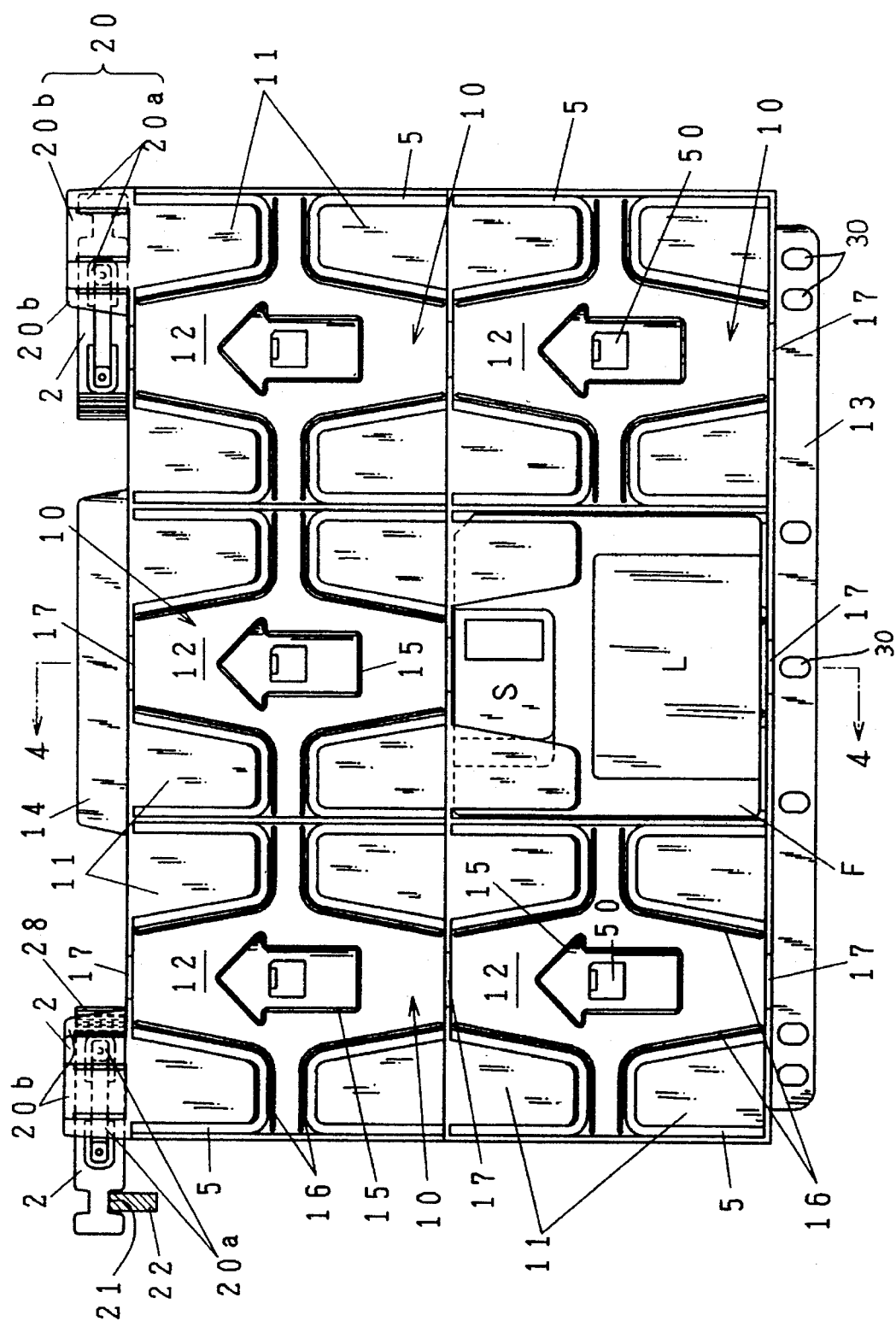

FLOPPY DISKETTE HOLDER

This application claims the priority of Japanese Patent Application No. 5-105710 (105710/1993) filed May 6th, 1993.

FIELD OF THE INVENTION

This invention relates to a floppy diskette holder, more particularly, to a floppy diskette holder for holding floppy diskettes in which each one magnetic disc with information recorded therein is in a hard case made of hard resin.

BACKGROUND OF THE INVENTION

As a floppy diskette holder for holding/storing three and one-half inch floppy diskettes F, each diskette including one magnetic disc as an information recording medium in a thin rectangular hard case made of a rigid resin, there have been devised those for an array of floppy diskettes inserted in parallel on a plastic sheet on one side or on both sides thereof.

Especially, what is disclosed in the U.S. Pat. No. 4,676,374 has six rectangular dish-shaped floppy disk receptacles (hereinafter called FD receptacles 10 ) on each side of a rectangular frame made of an elastic synthetic resin and resilient tabs 11 extending from a center of an open edge of one side wall of each FD receptacle 10 diagonally downward into the FD receptacles 10. When a floppy diskette F is inserted into the FD receptacle 10, the floppy diskette F is held between a free end of the resilient tab 11 and a bottom of the FD receptacle 10. In this case, holes for filing in a binder are made on one side of the holder, so that a plurality of holders can be filed easily.

Thus, although the former diskette holder is convenient for storing/holding a large number of floppy diskettes F, the resilient tab 11 is, as mentioned above, extended from the center of the upside of the side wall of each FD receptacle 10, hence a center area of the floppy diskette F may be pressed by the resilient tab 11.

A slide cover S is provided about one side of this kind of floppy diskette for opening/closing the window for writing in or reading from the magnetic disc inside, while a labelling part or section L is provided at the range from the other side to the center portion for receiving a label containing information corresponding to the matter recorded in the magnetic disk.

According to the aforementioned prior art, however, when the floppy diskette F is inserted into the FD receptacle 10, as shown in FIG. 1, one of the sides other than that along the slide cover S is under the resilient tab 11, hence, the labelling part or section L of the floppy diskette F is covered by the resilient tab 11. This making it difficult to see the information of the label on the labeling part L. The problem can be solved by inserting the floppy diskette FD with its slide cover S on the same side as the resilient tab 11, as shown in FIG. 2, but this accompanies the risk of the slide cover S being in sliding contact with the end of the tab 11 as the floppy diskette F inserted or removed. When repeating this, there is a risk that the smoothness of opening and closing the slide cover S being deteriorated.

A purpose of this invention is to provide a floppy diskette holder holding a floppy disc in a FD receptacle thereof stably without any risk of the slide cover S or the labelling part or section L of the floppy diskette F being pressed against by the resilient tab 11. Another purpose of the invention is to make it easy to insert the floppy diskette F into the FD receptacle 10 without a mis-insertion thereof.

SUMMARY OF THE INVENTION

The floppy diskette holder generally molded of elastic syntheic resin according to this invention, comprises plural rectangular frame units made by dividing a rectangular frame, a partition wall 12 dividing each of the frame units into dish-like trays disposed back-to-back for storage of floppy diskettes. Each tray is called an FD receptacle 10. A resilient tab 11 extends into each FD receptacle 10 diagonally downward to press against the floppy diskettes. A pair of the resilient tabs 11 extend from both ends of the edge of one side wall to about middle portions of the FD receptacle 10. The one side wall corresponds to the slide cover side of the floppy diskette F held in the FD receptacle 10. The distance from the partition wall 12 to a base end of the resilient tab 11 is set larger than the thickness of the floppy diskette F. The distance from the partition wall 12 to a free end of the resilient tab 11 is set smaller than the thickness of the floppy diskette F. The free ends of the resilient tabs 11 press against the outside portions of the slide cover S of the floppy diskette F.

Functions of this invention will be explained now.

When the floppy diskette F is inserted into the FD receptacle 10 beneath the free ends of the resilient tabs 11 with the slide cover side forward, the vicinities of both ends of one side of the floppy diskette F are pressed by a pair of resilient tabs 11 facing each other across the slide cover S. In other wards, since the free ends of the tabs 11 are set to be outside of the slide cover S, the slide cover S is not directly pressed by the Labs 11. Moreover, since the tabs 11 extend to the about middle portions of the FD receptacle 10, most of the label applied to the labelling part or section L of the floppy diskette F is not hidden by the resilient tabs 11.

The distance between the partition wall 12 and the base end of the tab 11 is larger than the thickness of the floppy diskette F, and since the distance between the partition wall 12 and the free end of the tab 11 is smaller than the thickness of the floppy diskette F, the tab 11 extend from the open end of the FD receptacle 10 toward the partition wall 12 inwardly and diagonally downward. Since the holder as a whole is made of an elastic resin, the floppy diskette F in the FD receptacle 10 is pressed against the partition wall 12 by the free end of the tab 11 by the elastic force thereof.

The advantages of this invention are as follows. Since both outside parts of the slide cover S of the floppy diskette F are pressed by the free ends of the resilient tabs 11, there is no risk of deterioration of the smoothness with which the slide cover S opens and closes, even if the floppy diskette F is inserted into the FD receptacle 10 repeatedly. Also, since most of the label applied to the labelling part L is not hidden by the tabs 11, the subject matter on the label can be confirmed.

Since the approximate center portion of the opposite sides of the floppy diskette F are pressed strongly between the free end of the tabs 11 and the partition wall 12 by the elastic force of the tabs 11, the floppy diskette F is stably held in the FD receptacle and, since only the free end of the resilient tabs 11 only are in contact with the floppy diskette F, there is practically no risk of the magnetic disc of the floppy diskette F being injured when the floppy diskette F is inserted into the FD receptacle 10.

Other improvements of this invention are further characterized as follows: An arrow-shaped rib 15 is provided in the central part of the partition wall 12 of each FD receptacle 10. The arrow-shaped rib 15 indicates the direction opposite to the direction which the resilient tabs 11 extend. Peripheral ribs 16 are provided in each corner of the partition wall 12. Each peripheral rib 16 is the same in height as the rib 15. An illustration of a floppy diskette is marked within the arrow-shaped rib 15 with a slide cover of the illustration displayed in the direction indicated the arrowhead.

Functions of this improvement will be explained now. Since an arrow marked in rib 15 is displayed in the FD receptacle 10 together with a pattern of a floppy disc, there is reduced risk of accidental mis-insertion, since the arrow and pattern indicates that the floppy diskette F should be inserted into the FD receptacle 10 sliding over the partition wall 12 in the direction indicated by the pattern of the aforementioned floppy diskette and also by the arrow marked in rib 15. In other words, the floppy diskette F can be set into the FD receptacle 10 with the slide cover S of the floppy diskette F toward the resilient tabs 11. And since the peripheral ribs 16 being the same in height as the arrow-shaped rib 15, are provided in the corners of the partition wall 12, the floppy diskette F inserted into the FD receptacle 10 is held by the ribs 15 and peripheral ribs 16 are supported at a uniform height, so that the floppy diskette F is not pivotable in the FD receptacle 10. Also, when the floppy diskette F is inserted into the FD receptacle 10 sliding over the partition wall 12, there is no risk the floppy diskette F will collide with the rib 15.

Thus, the improvement has an advantage of making it easier to insert the floppy diskette F into the FD receptacle 10 in the right posture.

Another improvement provided by this invention is characterized in that a pair of hook holders 20 project upward at both ends of the upper side of the rectangular frame. A pair of hooks 2 are provided slidably in right and left directions in the hook holders 20. Free ends of the hooks 2, which project from the hook holders 20, project beyond both sides of the frame, respectively. The hooks 2, which do not project from the hook holders 20, do not project from either side.

The improvement has advantages of permitting the floppy diskette holders to be hung by engaging them on two opposite rails in a desk's drawer or the like. Since the hook holders 20 project upward from both ends of the upper side of the rectangular frame, and the hooks 2 are set to the hook holders so as to be movable sideways, when the outer end of each hook projects to the right and left, the floppy diskette holder has the two hooks extended on both sides. Thus, when they are set in a drawer with hanger rails, the hooks 2 catch the hanger rails and the floppy diskette holder can be used as a hanging holder. When the hooks 2 are pushed inwardly, the hooks 2 do not project beyond the ends of the flippy diskkette holder. So when it is not use as a hanging holder, the hooks cannot be a disturbance.

BRIEF DESCRIPTION OF THE DRAWINGS

FIG. 3 is a plan view of the floppy diskette holder of this invention.

DETAILED DESCRIPTION OF PREFERRED EMBODIMENTS

Embodiments of this invention are explained with reference to the figures.

Figure 1:
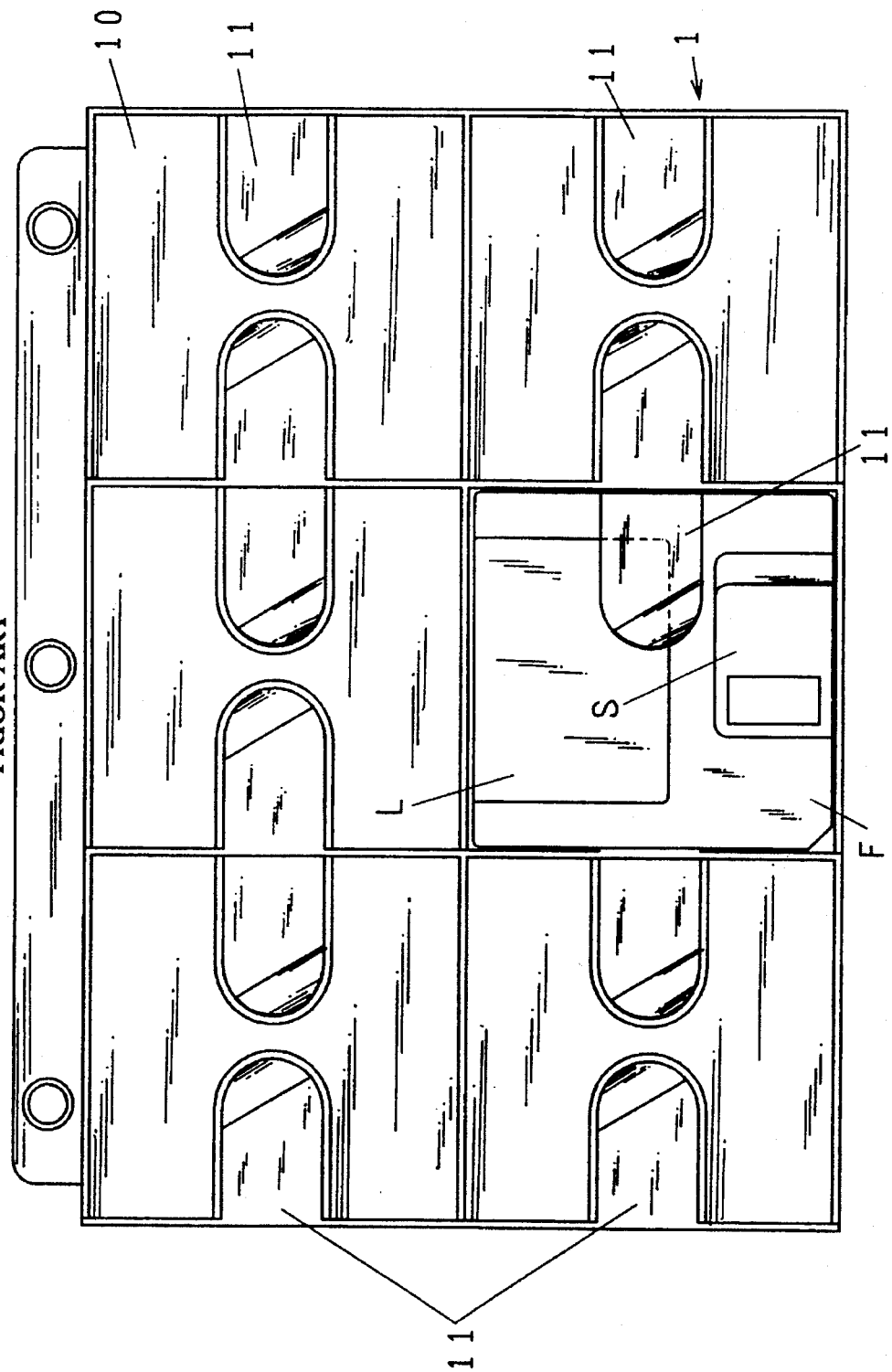
FIG. 1 is a schematic view of a prior floppy diskette holder.
Figure 2:
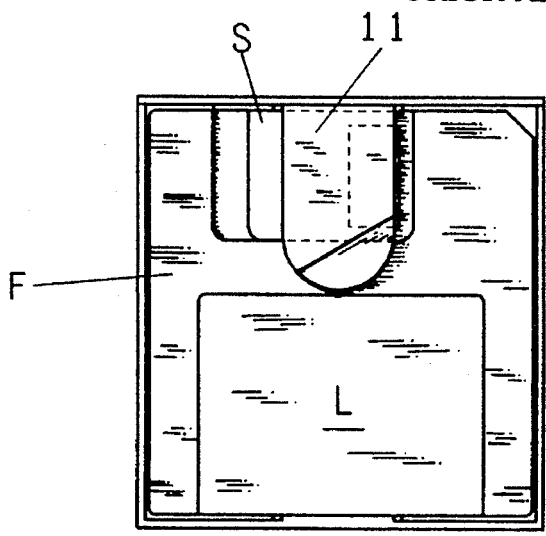
FIG. 2 is a schematic view of a FD receptacle of the prior floppy diskette holder holding a floppy diskette in a different posture.
Figure 4:
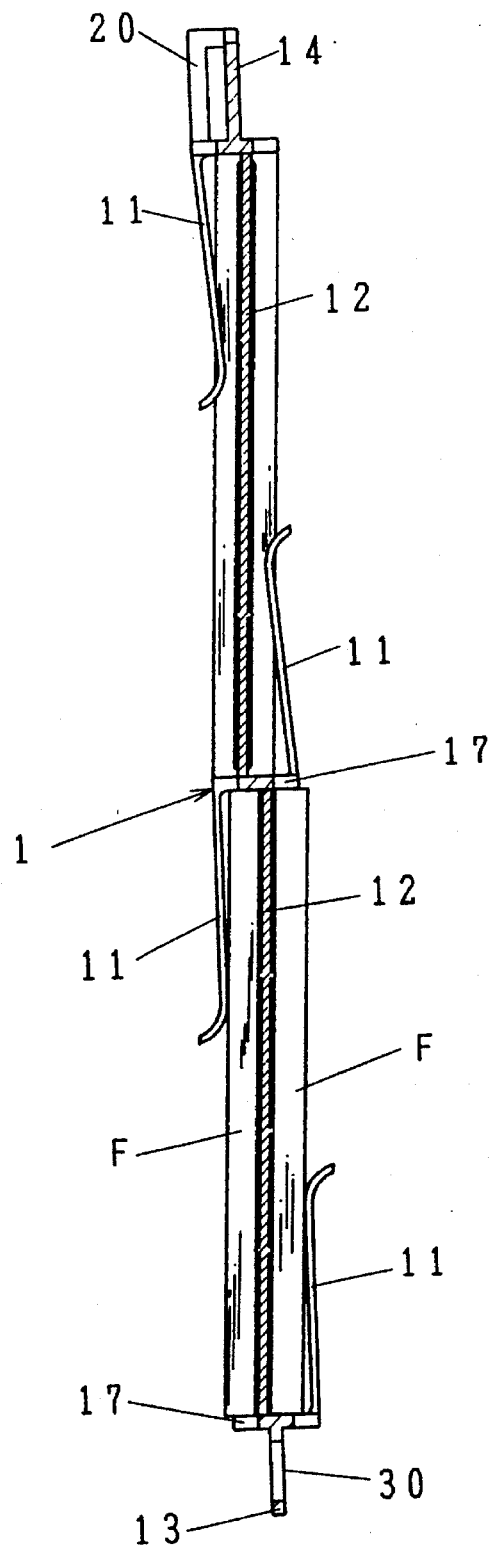
FIG. 4 is a sectional view taken along the line 4—4 of FIG. 3.

As shown in FIG. 3, the floppy diskette holder for three and one-half inch hard case floppy diskettes, in accordance with the present invention, has twelve dish-like rectangular FD receptacles 10, each for storage of a floppy diskette F, six on each side of a plastic rectangular frame 1. The FD receptacles 10 are arranged in an array of three rows and two columns in each, side of the frame 1, and the FD receptacles 10 disposed in back-to-back relation are divided by a common partition wall 12 as shown in FIG. 4. In this floppy disktte holder each FD receptacle 10 is so dimensioned that just a three and one-half inch floppy disc can be accommodated and the length of the FD receptacle 10 in a columnar direction is almost in agreement with the distance between one side deposited a slide cover S and the opposite side of the floppy diskette F. The lateral length of the FD receptacle 10 is almost in agreement with the lateral length of the floppy diskette F.

The successible partition walls 12 of the FD receptacles 10 in the columnar direction in the frame 1 do not continue straight, as shown in FIG. 4. They slant individualy by a predetermined degree. As shown in the aforementioned FIG. 3, four cut out portions 5 are provided at corners of the partition wall 12, two on each of the upper surface and lower surfaces thereof, and four resilient tabs 11 are provided over the cut out portions 5. The upper two tabs project toward the obverse side of the FD receptacle 10, while the lower two tabs project toward the reverse side of it. These tabs 11 extend to about the center portions of the longitudinal sides of the FD receptacles 10 in back-to-back relation.

The resilient tabs 11, as shown in FIG. 4, incline so that their free ends are nearer to the partition wall 12 than the base ends. The distance between the partition wall 12 and the base end of each resilient tab 11 is somewhat larger the thickness of the floppy diskette F and the distance between the partition wall 12 and the free end of the tab 11 is set smaller than the thickness of the sloppy diskette F. The free end of each tab is bent away from the partition 12. Since these tabs 11 are integrated with the rectangular frame 1 which is made of a synthetic resin, the tabs 11 have elasticity.

Meanwhile, a filing flange 13, with a plurality of holes 30 spaced apart to receive rings of a binder extends downward from the lower end wall of the rectangular frame 1, while the index tab 14 extends from a center of an upper side of the rectangular frame 1 upward and a pair of hook holders 20 also extend upward at both ends portions of the upper side.

Figure 5:
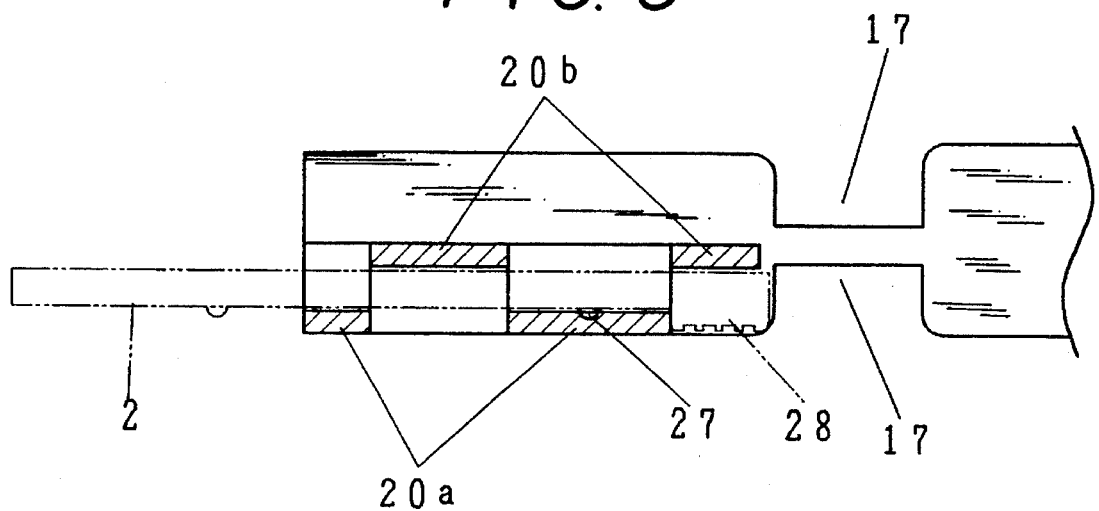
FIG. 5 is a sectional view of a hook holder.
Figure 6:
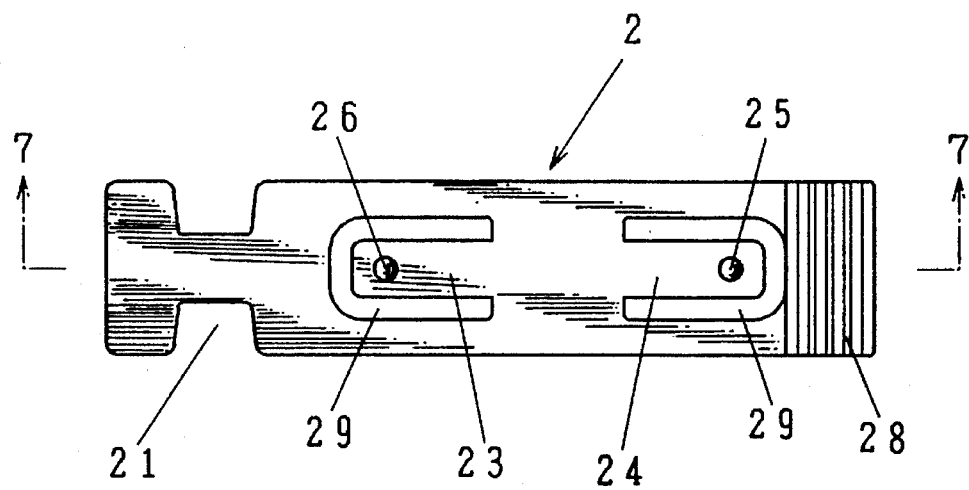
FIG. 6 is a plan view of a hook.
Figure 7:
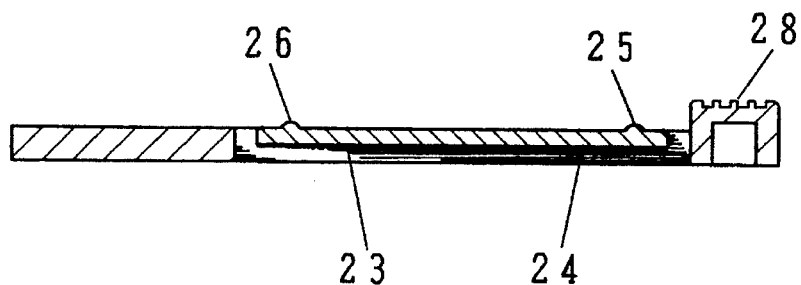
FIG. 7 is a sectional view taken along the line 7—7 in FIG. 6.

Each hook holder 20 is in cubic structure composed of a pair of obverse supporting parts 20a and a pair of reverse supporting parts 20b, and a the hook 2 that is slidably forward and backward is disposed therebetween. The hook 2 supported by the hook holder 20 is, as shown in FIG. 6, long rectangular thin plate and is, as shown in FIG. 3 and FIG. 5, inserted slidably between the obverse supporting parts 20a and the reverse supporting parts 20b. In the vicinity of a forward end of the hook 2 a cut portion 21 is provided for hanging on a hanger rail 22.

A pair of U-shaped slots 29 facing each other are formed in an inner central part of the hook 2. The inner parts of these slots 29 are thin-walled compared with the outer part thereof to make a pair of elastic pieces 23, 24. The free end of the elastic piece 23 faces the forward end of the hook 2, while the free end of the other elastic piece 24 faces the base end of the hook 2.

On the outer surfaces of the free ends of the elastic pieces 23, 24 there are two projections 25, 26 for engaging with concavities 27 provided on the reverse side of the inside obverse supporting part 20a. When the projection 25 provided on the elastic piece 24 on the base end of the hook 2 is engage with the concavities 27, the hook 2 projects outward of the side of the rectangular frame 1, like the relationship between the left, hook holder 20 and the left hook 2 shown in FIG. 3, and the dimentional relationship is such that the cut portions 21 can be engage with the hanger rails 22 provided in a desk's file drawing.

A stopper 28 which collides with the side of the inside obverse supporting part 20a is provided at the base end of the hook 2 so as to prevent the hook 2 from extending too much beyond the hook holder 20.

When the hook 2 is pushed inward, the projection 26 of the elastic piece 23 at the forward end of the hook 2 is caused to engage with the concavity 27. Then, as seen from the relationship between the hook holder 20 and the hook 2 as shown on the right side in FIG. 3, the forward end of the hook 2 does not project beyond the hook holder 20. This ensures against interference by the hook 2, when the floppy diskette holders of this embodiment are filed in a binder.

The elastic pieces 23, 24 are thin-walled compared with other parts as mentioned above, hence they are free to deform elastically. Thus, when the hook 2 is forcibly moved forward and backward in the hook holder 20, the elastic pieces 23, 24 are forced to deform elastically and the projection 25, 26 of the elastic pieces 25, 24 are freely disengageably engaged in the concavity 27 of the inside obverse supporting part 20a.

At the center of the partition wall 12 of each FD receptacle 10 of this embodiment, as shown in FIG. 3, an arrow-shaped loop-like rib 15 is formed pointing to the base ends of the resilient tabs 11. In this embodiment, as mentioned above, the resilient tabs 11 are formed at the four corners of the partition wall 12 for two FD receptacles disposed back-to-back. Two tabs on the upper side project downward, while two tabs on the lower side project upward. Hence it is so arranged that the arrows on opposite sides (the upper and lower surfaces) of the partition wall 12 point in opposite directions. In the partition wall 12 peripheral ribs 16, which are the same in height as the ribs 15, are formed along the sidewall of the cut-out portions 5 so that the rib 15 is not alone raised. This means that, when a floppy diskette F is inserted into the FD receptacle 10, since the floppy diskette F is supported at four corner portions and the center portion thereof by the rib 15 and the peripheral ribs 16 equal in height, the floppy diskette F can be inserted in the FD receptacle 10 without receiving a jolt.

In order to insert the floppy diskette F into each FD receptacle 10 of the floppy diskette holder, the floppy diskette is made to get into under the free ends of the resilient tabs 11 of the FD receptacle 10 by elastically deforming the tabs 11 and then sliding the diskette toward the base end of the tabs 11. Since the free ends of the resilient tabs 11 elastically press the floppy diskette F toward the partition wall 12 by the floppy diskette F is pressed and held between the resilient tabs 11 and the partition wall 12 without accidentally coming out. In this embodiment the arrow-shaped loop like rib 15 is formed in the partition wall 12 with a figure (50) drawn therein showing the floppy diskette. Hence, when the floppy diskettes F are inserted into the FD receptacles 10 in the same direction as indicated by the figures 50 and along the directions of the arrows indicated by the ribs 15, the floppy diskettes can be held in the FD receptacles 10 in the right posture with the tabs 11 pressing on both sides of the slide cover S of each floppy diskette F.

The upper wall and the lower wall of each FD receptacle 10 is provided with a centrally located opening 17 as shown in FIG. 3 and FIG. 4. Thus, a part of the floppy diskette F is exposed through the opening 17 formed in an entry wall facing the resilient tabs 11. Accordingly, when the floppy diskette F is taken out of the obverse side FD receptacle 10, the lower end portion of the floppy diskette F is held by two finger tips through the opening 17 formed in the lower entry wall and is pulled downward, while for taking the floppy diskette F out of the reverse side FD receptacle 10 the upper end portion of the floppy diskette F may be held between the fingers through the upper entry wall and then pulled upward.

Even when the floppy diskette holders of the present invention are bound by means of the filing flange 13 or when they catch the hanger rails 22 in the desk's drawer by means of hooks, the information stored in the floppy diskette F held in the holder may be noted on the index tab 14 disposed between the hooks 2 for convenient reference.

What is claimed is:

1. A floppy diskette holder molded of elastic synthetic resin, comprising:

a rectangular frame divided into plural rectangular frame units, each frame unit including a respective partition wall having opposite end faces and dividing said frame unit into a two-sided tray forming respective receptacles on opposite sides of the partition wall for storage of a floppy diskette having a slide cover which has outside portions, each receptacle having opposite first and second side edges along the respective opposite end faces of the partition wall on which the receptacle is formed and storing the floppy diskette with the slide cover adjacent to the first side edge, and resilient tabs to press against the floppy diskettes stored in each receptacle, wherein a pair of the resilient tabs extend from opposite ends of said first side edge of each receptacle thereinto, and wherein in each receptacle, (1) a distance from the partition wall to a base end of each resilient tab is larger than a thickness of the stored floppy diskette, (2) a distance from the partition wall to a free end of each resilient tab is smaller than the thickness of the floppy diskette, and (3) the free ends of the pair of resilient tabs press against the outside portions of the slide cover of the stored floppy diskette.

2. A floppy diskette holder according to claim 1, wherein each floppy diskette has a first diskette edge, a second diskette edge opposite the first diskette edge and a labeling section, wherein the slide cover of the floppy diskette has a first part disposed adjacent to the first diskette edge and a second part opposite the first part, wherein the labelling section has an outer part adjacent to the second diskette edge and an inner part adjacent to the second part of the slide cover, and wherein each resilient tab has a length less than a distance from the first diskette edge of the floppy diskette to the inner part of the labelling section.

3. A floppy diskette holder according to claim 2, wherein in each receptacle, an exposed surface of the partition wall has an arrow-shaped rib projecting from a central portion thereof, the arrow-shaped rib points in a direction from the first side edge toward the second side edge, the arrow-shaped rib projects to a predetermined height above said surface, said surface has four corners adjacent to opposite ends of the first and second side edges, said surface further has peripheral ribs projecting from said four corners to the predetermined height above said surface, and on said surface, an illustration of a floppy diskette is marked within the arrow-shaped rib with a slide cover representation oriented toward said first side edge.

4. A floppy diskette holder according to claim 3, wherein said rectangular frame has mutually opposite first and second frame sides and mutually opposite third and fourth frame sides connecting said first and second frame sides, and further comprising first and second hook holders at opposite ends of said first frame side respectively adjacent to the third and fourth frame edges, and first and second hooks respectively disposed in said first and second hook holders, wherein said first hook is slidable toward and away from said second hook holder between a first position and a second position, wherein the first position is between the third and fourth frame edges as measured in a normal direction which is normal to the third and fourth frame edges, wherein the second position is beyond the third frame edge as measured in the normal direction, wherein said second hook is slidable toward and away from said first hook holder between a third position and a fourth position, wherein the third position is between the third and fourth frame edges as measured in the normal direction, and wherein the fourth position is beyond the fourth frame edge as measured in the normal direction.

5. A floppy diskette holder according to claim 1, wherein said rectangular frame has mutually opposite first and second frame sides and mutually opposite third and fourth frame sides connecting said first and second frame sides, and further comprising first and second hook holders at opposite ends of said first frame side respectively adjacent to the third and fourth frame edges, and first and second hooks respectively disposed in said first and second hook holders, wherein said first hook is slidable toward and away from said second hook holder between a first position and a second position, wherein the first position is between the third and fourth frame edges as measured in a normal direction which is normal to the third and fourth frame edges, wherein the second position is beyond the third frame edge as measured in the normal direction, wherein said second hook is slidable toward and away from said first hook holder between a third position and a fourth position, wherein the third position is between the third and fourth frame edges as measured in the normal direction, and wherein the fourth position is beyond the fourth frame edge as measured in the normal direction.

6. A floppy diskette holder according to claim 5, further comprising an index tab on said first frame side midway between said first and second frame holders.

7. A floppy diskette holder, comprising:

a rectangular frame divided into plural rectangular frame units, each frame unit having a partition wall with opposite end faces and dividing the frame unit into receptacles on each side of the partition wall for storage of floppy diskettes having slide covers with outside portions, wherein each receptacle has opposite first and second side edges along the respective opposite end faces of the partition wall on which the receptacle is formed, and wherein the receptacle stores the floppy diskette with the slide cover thereof adjacent to the first side edge; and resilient tabs having free ends to press against the floppy diskette stored in each receptacle;

wherein in each receptacle a respective pair of said resilient tabs has base ends at opposite ends of said first side edge, said pair of resilient tabs extends from said base ends to said free ends in a direction toward the second side edge, and the free ends of the pair of resilient tabs press against the outside portions of the slide cover of the stored floppy diskette.

8. A floppy diskette holder according to claim 7, wherein in each receptacle said base ends are fixed at a location spaced from said partition wall by a distance greater than a thickness of the floppy diskette and the free ends are spaced from the partition wall by a distance less than the thickness of the floppy diskette when the floppy diskette is not being stored in the receptacle.

9. A floppy diskette holder according to claim 8, wherein each floppy diskette has a first diskette edge, a second diskette edge opposite the first diskette edge and a labeling section, wherein the slide cover has a first part adjacent to the first diskette edge and a second part opposite the first part, wherein the labelling section has an outer part adjacent to the second diskette edge and an inner part adjacent to the second part of the slide cover, and wherein each resilient tab has a length less than a distance from the first diskette edge of the floppy diskette to the inner part of the labeling section.

10. A floppy diskette holder according to claim 9, wherein in each receptacle, an exposed surface of the partition wall has an arrow-shaped rib projecting from a central portion thereof, said arrow-shaped rib points in a direction from the first side edge toward the second side edge thereof, said arrow-shaped rib projects to a predetermined height above said surface, said surface has four corners adjacent to opposite ends of the first and second side edges, and said surface further has peripheral ribs projecting from said four corners to the predetermined height above said surface.

11. A floppy diskette holder according to claim 10, wherein on said exposed surface of each receptacle, an illustration of a floppy diskette is marked within the arrow-shaped rib with a slide cover representation oriented toward said first side edge.

12. A floppy diskette holder according to claim 11, wherein said rectangular frame has mutually opposite first and second frame sides and mutually opposite third and fourth frame sides connecting said first and second frame sides, and further comprising first and second hook holders at opposite ends of said first frame side respectively adjacent to the third and fourth frame edges, and first and second hooks respectively disposed in said first and second hook holders, wherein said first hook is slidable toward and away from said second hook holder between a first position and a second position, wherein the first position is between the third and fourth frame edges as measured in a normal direction which is normal to the third and fourth frame edges, wherein the second position is beyond the third frame edge as measured in the normal direction, wherein said second hook is slidable toward and away from said first hook holder between a third position and a fourth position, wherein the third position is between the third and fourth frame edges as measured in the normal direction, and wherein the fourth position is beyond the fourth frame edge as measured in the normal direction.

13. A floppy diskette holder according to claim 11, wherein said frame, said partition walls and said resilient tabs are all formed of elastic synthetic resin.

14. A floppy diskette holder according to claim 7, wherein said rectangular frame has mutually opposite first and second frame sides and mutually opposite third and fourth frame sides connecting said first and second frame sides, and further comprising first and second hook holders at opposite ends of said first frame side respectively adjacent to the third and fourth frame edges, and first and second hooks respectively disposed in said first and second hook holders, wherein said first hook is slidable toward and away from said second hook holder between a first position and a second position, wherein the first position is between the third and fourth frame edges as measured in a normal direction which is normal to the third and fourth frame edges, wherein the second position is beyond the third frame edge as measured in the normal direction, wherein said second hook is slidable toward and away from said first hook holder between a third position and a fourth position, wherein the third position is between the third and fourth frame edges as measured in the normal direction, and wherein the fourth position is beyond the fourth frame edge as measured in the normal direction.

15. A floppy diskette holder according to claim 14, further comprising an index tab on said first frame side midway between said first and second frame holders.

* * * * *